Nov. 5, 1968

T. F. SPARKS 3,408,688

HIDE REMOVAL METHOD

Filed July 7, 1966

INVENTOR.
THOMAS FRANKLIN SPARKS
BY Carl C. Betz
ATTY.

United States Patent Office 3,408,688
Patented Nov. 5, 1968

---

3,408,688
HIDE REMOVAL METHOD
Thomas Franklin Sparks, West Point, Nebr., assignor to Armour and Company, Chicago, Ill., a corporation of Delaware
Filed July 7, 1966, Ser. No. 563,511
4 Claims. (Cl. 17—45)

This invention relates to a new method for removing the hides from the carcass of livestock suspended from an overhead conveyor prior to removal of their legs and head.

Removing hides from livestock such as steers, cows, bulls, hogs, lambs and the like has been accomplished by essentially the same methods used for generations. One of the earliest methods still in practice is generally comprised of the steps of lying the carcass on the floor of the skinning area, severing the head and portions of the fore legs and hind legs, slitting open the hide along the underside of the carcass, skinning or peeling back each edge of the slit hide from the underside of the carcass, pulling the hide from the underside to the backside until removed from the carcass, and removing the entrails.

A more recent method used primarily for cattle such as cows, steers, bulls, and the like, is generally the same as the one just described except that the carcass is suspended from its hind legs and the hide is pulled upwardly from the backside of the carcass until removed therefrom after having first secured the fore legs to a stationary structure to prevent the carcass from moving up with the hide.

Slitting, skinning, and removing the entrails is usually done by hand and with a knife. Pulling the hide upwardly and off the carcass in the latter described method is usually done by a mechanical hide puller attached to a portion of the hide peeled back by hand from the lower end of the carcass. As the hide puller is activated and begins to pull the hide away from the carcass, portions of fat and flesh are pulled away from the carcass and retained by the hide. Attendants stand by to assist this operation by following the hide as it is being pulled off and manually cutting the flesh and fat underneath the hide in areas where it appears as if excessive portions will be ripped from the carcass.

One major problem introduced by present methods is contamination of the carcass. Hides usually have manure, dirt and the like on their surface prior to removal from the carcass. When the carcass is suspended from its hind legs this debris is shaken loose as the hide is pulled upwardly and off the carcass, and falls on and adheres to the moist and sticky flesh and fat of the skinned carcass. This is a health hazard requiring additional man hours to clean the carcass and rid it of debris. This cleaning process usually comprises manually cutting any foreign matter from the skinned carcass and then washing the carcass with a stream of water under pressure.

The present methods also tend to reduce the value of the hide and of the cuts of meat subsequently made from the skinned carcass. On the back of the carcass of cattle there is a layer of fat between the hide and the flesh. This fat layer becomes thinner on the sides of the carcass until the underside is reached where there is generally little or no fat at all. The fat and flesh are covered by a thin membrane referred to as the "fell" which exists immediately under the hide. The present method slits the hide on the underside and skin it by pulling the hide by hand using a knife to free it from the flesh. However, the hide in this area is only separated from the flesh by the fell and the hide may be cut and damaged if the knife is used too close thereto. If the knife is used too far from the hide and into the flesh, valuable meat will be lost to the carcass and carried with the hide where it is of no value.

Thus, because of the closeness of the hide to the flesh on the underside of the carcass, and the difficulty in avoiding damage to the hide without cutting too much meat from the carcass, this hand-skinning step has proven to be very slow and tedious. As a compensation, many attendants are stationed at various parts of the underside to simultaneously skin various portions of the hide to permit a high rate of hides to be removed per unit of time.

A further problem introduced by these procedures is the maintenance of the knives used to slit the underside. These knives can be simple butcher knives but are more often "air knives" having scissor-like blades actuated by air pressure. The underside of the carcass usually has a good deal of gritty material mixed with the debris and gets into the mechanism of the knives requiring them to be serviced frequently to be kept in proper operating condition.

Another step in present methods comprises pulling the hide off the back side of the carcass from the front to the rear or pulling the hide upwardly when the carcass is suspended from its hind legs. This direction of pull is used because of the "grain" of the fell in cattle. It is believed that the fell has a "grain" or internal arrangement of such a nature that it facilitates a sharp separation with the hide when pulled toward the rear or upwardly thereby allowing the fell to be left on the skinned carcass and form a natural casing surrounding the fat and flesh of the carcass.

In practice, however, it is found that when the hide is pulled in this manner, separation of the hide from the carcass tends to occur in the layer of fat underneath the fell and not at the interface of the hide and fell. As a consequence, much of the fat is removed with the hide and lost to the carcass. Furthermore, cuts of meat made from the back of the carcass are commercially the most valuable and the loss of fat to these cuts amounts to a substantial loss in their value.

A further disadvantage of present methods is that hides produced thereby do not have the maximum usable area of hide. Hides are very loose and flabby on the underside of the carcass and when slit on the underside and subsequently removed from the carcass, the edges of the hide formed by the slit will be "wavy" and irregular. The value of hides to tanners and the like who purchase hides to make leather is determined in part by the number of square feet or inches of hide. Irregular edges of hides cannot be computed in this area and are thus lost.

It is an object of the present invention to provide a new method for removing hides from the carcass of livestock that will result in a skinned carcass relatively free of contamination and requiring very little cleaning.

Another object of the present invention is to provide a new method for removing hides from the carcass of livestock that will increase the value of the hides by reducing the amount of damage to the hides and by increasing the area of hide useable to tanners and the like.

A further object of the present invention is to provide new method for removing hides from the carcass of livestock that will increase the value of the skinned carcass by decreasing the amount of flesh and fat taken away from the carcass by the hide while being removed.

Other objects and advantages of the invention will become apparent as the specification proceeds.

The present invention is a new method for removing the hides from the carcass of livestock and generally comprises the steps of slitting the hide longitudinally along the back of the carcass, peeling back each edge of the hide adjacent to the slit until it is substantially off the back portion of the carcass, and pulling off the hide downwardly from the underside of the carcass until removed therefrom.

In the preferred operation of this new method, the carcass is suspended by its hind legs from an overhead conveyor. The entrails and members of the carcass such as the head and the legs are left intact and are not removed prior to removal of the hide.

The invention will be more specifically described in connection with the accompanying drawings, in which.

Figure 1:
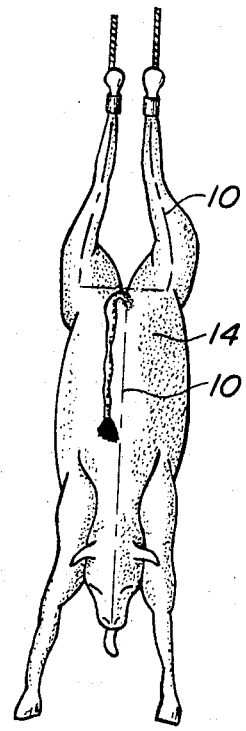
FIGURE 1 is an elevational view of a carcass suspended by its hind legs from an overhead conveyor (not shown) and longitudinally slit along its back side.

Referring now to the drawings, and particularly to FIGURES 1–4, a longitudinal slit 10 is made along the back 11 of the carcass 12 by hand and by means of a knife. The slit generally follows the spine and is made for the entire length of the carcass including the back of the head and the back of the hind legs. The hide 14 over the back of the carcass is relatively taut so when the hide 14 is removed the edges formed by the slit will be relatively straight.

Figure 2:
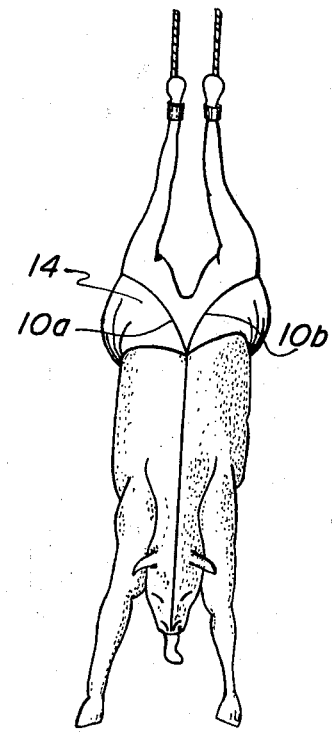
FIGURE 2 is a portion of the skinned back side of said carcass.

Each edge 10a and 10b of the hide 14 adjacent to the slit 10 is then skinned or peeled back until it is substantially off the back portion of the carcass as shown in FIGURE 2. This is done by hand and by means of an air knife. The hide 14 is very easily cut free from the thick layer of fat underneath which offers little resistance to the knife. The hide over the back area can thus be readily cleared away from the carcass with very little risk of cutting or damaging the hide and with very little fat left on the hide.

Figure 4:
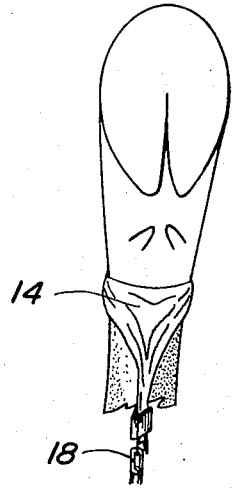
FIGURE 4 is a view of the underside of one of the hind legs of said carcass having the hide pulled back from the end portion thereof.

A mechanical hide pulling means 18 (only clamps shown) is next attached on the underside of the carcass to a small portion of hide, pulled away by hand from around the end portion of each hind leg as shown in FIGURE 4. When the hide pulling means is activated it begins to pull the hide downwardly away from the carcass. Since the hide has been slit along the backside and a portion of hide removed from each side of the slit, and because the clamps of the hide pulling means are attached on the underside of the carcass, the hide pulling force will thereby have both a vertically downward component and a horizontal component directed from the carcass backside to its underside, as indicated in FIGURE 2.

Figure 3:
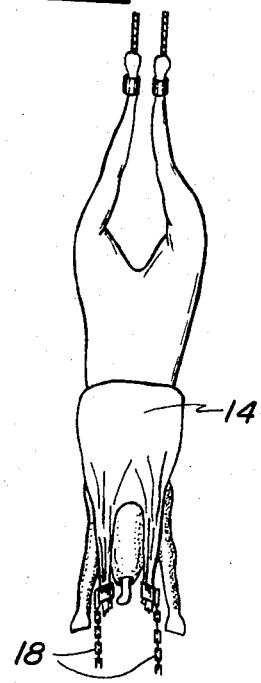
FIGURE 3 is an elevational view of said carcass and hide which has been substantially removed therefrom.

The hide 14 is stripped down the entire length of carcass until completely removed therefrom after being peeled from the head and forelegs as shown in FIGURE 3. The skinned carcass is in a relatively clean condition but is briefly washed with water to rid the carcass of excess blood and what little debris in the air that may adhere to the sticky surface of the carcass.

In the preferred embodiment of the method of the instant invention, air knives have been described as the means by which the back of the hide has been slit and skinned from the carcass. However, the invention is not limited thereto but comprehends any other suitable means which can perform this operation.

The preferred embodiment of the method of the instant invention also teaches the step of skinning or peeling back each edge of the slit hide until substantially off the back portion of the carcass. The invention is not limited to this step, however, but comprehends a method of removing hides where the hide on the back side has not been skinned prior to the subsequent hide pulling step.

The method of the instant invention is well suited for large scale commercial packinghouse operations where carcasses are processed continuously from overhead conveyors. However, the invention is not limited to this environment but can be utilized in any setting where hides are to be removed from the carcass of cattle.

The benefits and advantages of the method of the instant invention are considerable when compared with prior modes of operation.

First of all, a skinned carcass that is much cleaner results from working the invention. The invention teaches a step which pulls the hide downwardly as contrasted with the upward pulling of one of the prior methods. As a result, the debris shaken loose from the hide falls not on the skinned carcass but on the hide not yet stripped from the carcass. Furthermore, what little debris that may stick to the skinned carcass is very easily removed by briefly washing the carcass with water. There is considerable debris on the skinned carcass produced by the prior methods which requires extensive washing and even hand trimming of some areas that will not wash clean.

Furthermore, in the case of cattle, the skinned carcass resulting from working the invention is of more value because more fat is left on the carcass. The method of the instant invention slits and hand-skins the back of the carcass and not its underside. The layer of fat underneath the hide on the back is very easily cut and makes this area much easier to skin close to the hide to minimize the amount of fat left on the hide. The previous methods which hand-skinned on the underside invariably either damaged the hide or cut too much flesh from the carcass because the flesh is more difficult to cut than fat and is separated from the hide by the thin layer of fell. Thus, the retention of more fat on the back of the carcass adds substantially to its value as the cuts of meat therefrom are commercially the most valuable.

The hides produced by working the instant invention also tend to be more valuable than hides from other methods. There is much less chance of damage to the hide during the hand-skinning step, and the useable area of hide is increased by the resultant straight edge from slitting the hide on its taut back side rather than its loose underside which produces a "wavy," irregular edge. Furthermore, it has been found that slitting the hide on its back side does not detract from the commercial saleability of the hides.

While the embodiment of the invention chosen herein for purpose of the disclosure are at present considered to be preferred, it is to be understood that this invention is intended to cover all changes and modifications in said embodiments which fall within the spirit and scope of the invention.

What is claimed is:
1. In a method for removing the hides from suspended livestock carcasses the steps of:
 (a) slitting the hide longitudinally along the back of the carcass,
 (b) gripping the upper portions of the hide on each side of said longitudinal slit, and
 (c) applying a pulling force to the hide in a direction wherein said pulling force has vertical and horizontal components, said vertical component being in a downward direction and said horizontal component being directed from the back of the carcass to its underside.

2. The method as set forth in claim 1 wherein each edge of the hide adjacent said slit is manually skinned from the back portion of the carcass prior to the application of said pulling force.

3. The method as set forth in claim 1 wherein said slit is along the spine, the head, and the hind legs of the carcass.

4. The method as set forth in claim 1 wherein said pulling force is provided by mechanical hide pulling means.

References Cited

UNITED STATES PATENTS

| | | | |
|---|---|---|---|
| 77,724 | 5/1868 | Eschenlohr | 17—45 |
| 3,046,597 | 7/1962 | Macy et al. | 17—21 |
| 3,192,558 | 7/1965 | Niccollai | 17—21 |
| 3,209,395 | 10/1965 | Jones et al. | 17—21 |
| 3,336,628 | 8/1967 | Perardi | 17—21 |

LUCIE H. LAUDENSLAGER, *Primary Examiner.*